(12) United States Patent
Komatsu

(10) Patent No.: US 10,731,595 B2
(45) Date of Patent: Aug. 4, 2020

(54) FUEL INJECTION CONTROL DEVICE

(71) Applicant: DENSO CORPORATION, Kariya, Aichi-pref. (JP)

(72) Inventor: Ko Komatsu, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/208,626

(22) Filed: Dec. 4, 2018

(65) Prior Publication Data

US 2019/0170081 A1 Jun. 6, 2019

(30) Foreign Application Priority Data

Dec. 6, 2017 (JP) ................................. 2017-234722

(51) Int. Cl.
| | |
|---|---|
| *F02D 41/38* | (2006.01) |
| *F02D 41/40* | (2006.01) |
| *F02B 3/06* | (2006.01) |
| *F02D 35/02* | (2006.01) |
| *F02M 57/00* | (2006.01) |

(52) U.S. Cl.
CPC .............. *F02D 41/402* (2013.01); *F02B 3/06* (2013.01); *F02D 35/02* (2013.01); *F02D 41/403* (2013.01); *F02D 2041/389* (2013.01); *F02D 2200/0602* (2013.01); *F02D 2200/0614* (2013.01); *F02D 2200/0616* (2013.01); *F02D 2250/04* (2013.01); *F02M 57/005* (2013.01)

(58) Field of Classification Search
CPC ..... F02D 2200/0602; F02D 2200/0614; F02D 2200/0616; F02D 2250/04; F02D 41/402; F02D 41/403; F02D 35/02; F02D 2041/389; F02B 3/06; F02M 57/005; F02M 63/023; F02M 55/025; F02M 37/0041

USPC ........ 123/435, 456, 457, 490; 701/103–105; 73/114.43

See application file for complete search history.

(56) References Cited

U.S. PATENT DOCUMENTS

| | | | |
|---|---|---|---|
| 6,142,121 A | 11/2000 | Nishimura et al. | |
| 7,765,995 B2 * | 8/2010 | Nakata | F02D 41/221 123/490 |

(Continued)

FOREIGN PATENT DOCUMENTS

| | | |
|---|---|---|
| JP | 2012-145018 | 8/2012 |
| JP | 5817597 | 11/2015 |

*Primary Examiner* — Hai H Huynh
*Assistant Examiner* — Gonzalo Laguarda
(74) *Attorney, Agent, or Firm* — Nixon & Vonderhye P.C.

(57) ABSTRACT

A fuel injection control device includes a reference interval calculation section that calculates a reference interval between an end time of a decrease interval where the pressure decreases as a fuel injection rate increases and a start time of an increase interval where the pressure increases as the fuel injection rate decreases on a pressure waveform detected by the pressure sensor, an integration interval setting section that sets, in the reference interval, an integration interval where an influence of a disturbance on the fuel pressure decrease due to a target injection is suppressible, and a decrease amount calculation section that calculates a corresponding pressure decrease amount, which is a fuel pressure decrease amount corresponding to a maximum injection rate of fuel of the target injection, based on an integral value obtained by integrating the fuel pressure decrease amount due to the target injection in the integration interval.

20 Claims, 12 Drawing Sheets

(56) References Cited

U.S. PATENT DOCUMENTS

| | | | |
|---|---|---|---|
| 8,406,982 B2 * | 3/2013 | Yamada | F02D 41/3809 |
| | | | 123/447 |
| 8,849,592 B2 * | 9/2014 | Takashima | F02D 41/3863 |
| | | | 702/50 |
| 9,588,016 B2 * | 3/2017 | Ishizuka | F02D 41/3809 |
| 10,132,266 B2 * | 11/2018 | Matsubara | F02D 41/38 |
| 2015/0300286 A1 | 10/2015 | Ikemoto | |

* cited by examiner

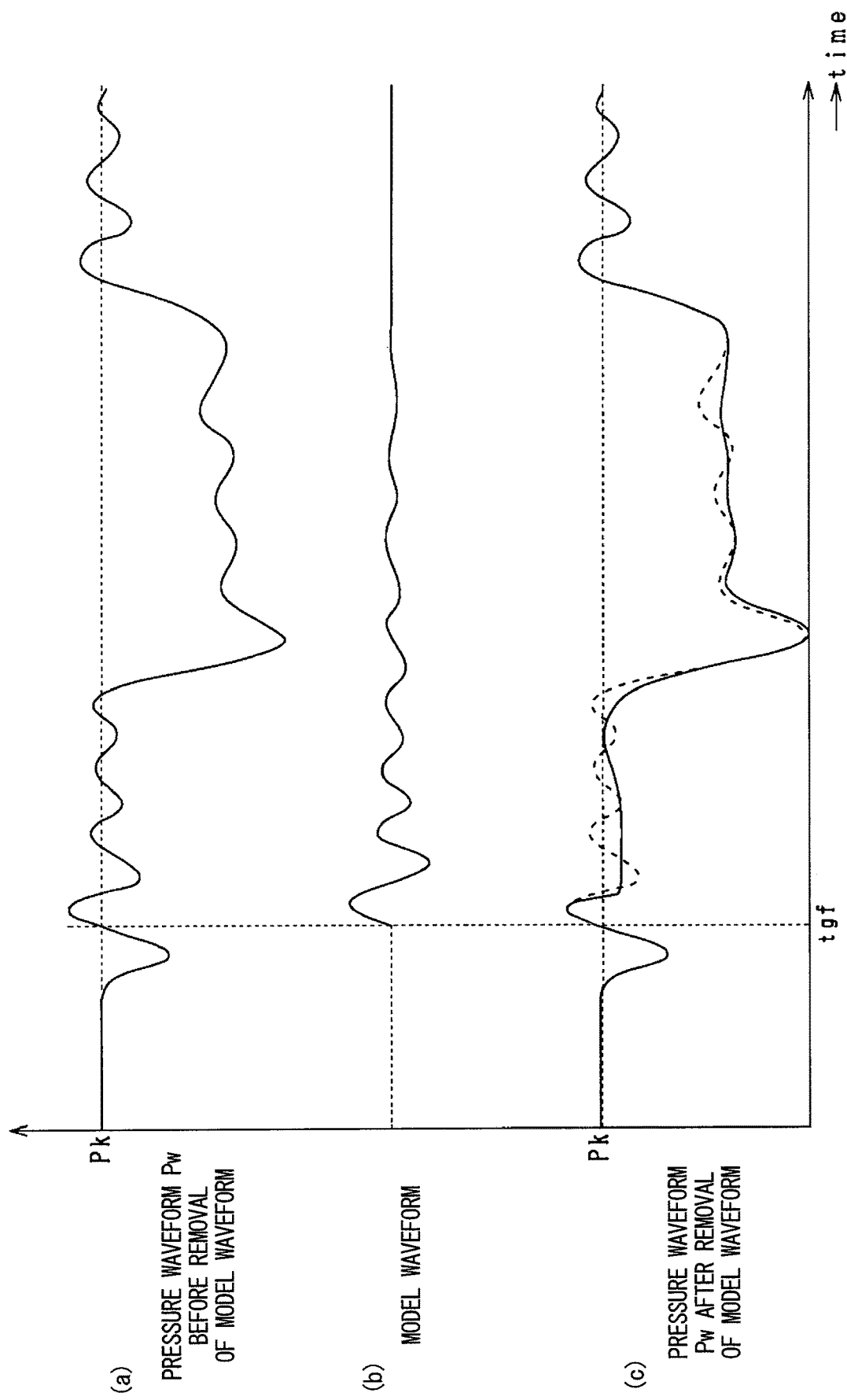

FUEL INJECTION CONTROL DEVICE

CROSS REFERENCE TO RELATED APPLICATION

The present application claims the benefit of priority from Japanese Patent Application No. 2017-234722 filed on Dec. 6, 2017. The entire disclosure of the above application is incorporated herein by reference.

TECHNICAL FIELD

The present disclosure relates to a fuel injection control device of an internal combustion engine applied to a fuel injection system including a pressure sensor.

BACKGROUND

A pressure sensor detects a pressure change (pressure waveform) of supplied fuel caused by a fuel injection. An injection rate is calculated from the detected pressure waveform.

SUMMARY

A fuel injection control device in an aspect of the present disclosure is applied to a fuel injection system including a pressure sensor that detects a pressure of fuel supplied to a fuel injection valve. The device includes a reference interval calculation section configured to calculate a reference interval between an end time of a decrease interval where the pressure decreases as a fuel injection rate increases and a start time of an increase interval where the pressure increases as the fuel injection rate decreases on a pressure waveform detected by the pressure sensor, an integration interval setting section configured to set, in the reference interval, an integration interval where an influence of a disturbance on the fuel pressure decrease due to a target injection is suppressible, and a decrease amount calculation section configured to calculate a corresponding pressure decrease amount, which is an amount of the fuel pressure decrease corresponding to a maximum injection rate of fuel of the target injection, based on an integral value obtained by integrating the amount of the fuel pressure decrease due to the target injection in the integration interval.

BRIEF DESCRIPTION OF THE DRAWINGS

The above and other objects, features and advantages of the present disclosure will become more apparent from the following detailed description made with reference to the accompanying drawings. In the drawings:

FIG. 8 is a time chart showing (a) a pressure waveform Pw before removal of a model waveform, (b) the model waveform, and (c) a pressure waveform Pw after the removal of the model waveform;

DETAILED DESCRIPTION

According to a technique of a comparative example, specifically, because there is a high correlation between a pressure decrease amount $\Delta P$ caused by increase in the injection rate and the injection rate dQ, the injection rate dQ is calculated by multiplying the pressure decrease amount $\Delta P$ detected from the pressure waveform by a coefficient such as a flow rate coefficient Cd. As a maximum injection rate dQmax, an instantaneous injection rate dQ at any time can be employed. For example, an injection rate dQ at a time when a pressure value of supplied fuel is substantially constant on a pressure waveform can be employed.

However, the pressure waveform of the technique of the comparative example changes due to disturbances such as pressure pulsation caused by a preceding injection of multistage injections and valve-opening pulsation caused by opening of a fuel injection valve other than a target injection. Therefore, even if an attempt to select the time when the pressure value of the supplied fuel is substantially constant on the pressure waveform is made, an actual pressure value of the supplied fuel varies. Therefore, when the instantaneous pressure decrease amount is acquired and the maximum injection rate is calculated from the acquired instantaneous pressure decrease amount, the acquired pressure decrease amount changes depending on the time when the pressure decrease amount is acquired and it is impossible to calculate the maximum injection rate with accuracy.

Respective embodiments in each of which a fuel injection control device according to the present disclosure is embodied will be described below based on the drawings. The fuel injection control device described below is mounted to an engine (internal combustion engine) for a vehicle and, as the engine, a diesel engine in which high-pressure fuel is injected and caused to self-ignite under compression in each of a plurality of cylinders #1 to #4 is thought of.

First Embodiment

Figure 1:
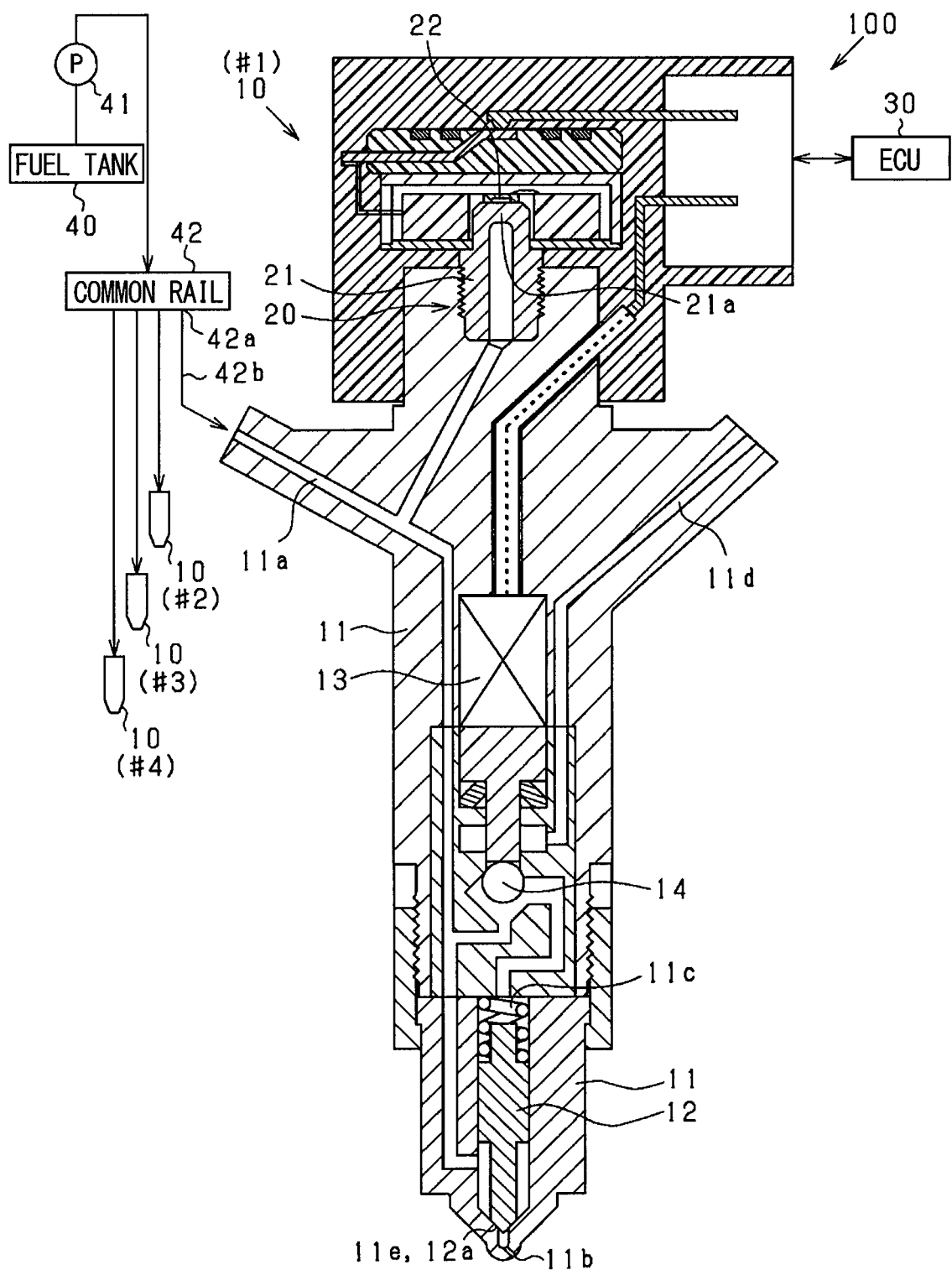
FIG. 1 is a schematic view of a configuration of a fuel injection system.

FIG. 1 is a schematic view of a fuel injection system 100 including fuel injection valves 10 mounted to the respective cylinders of the engine, pressure sensors 20 mounted to the respective fuel injection valves 10, an ECU (control circuit)

30 which is a fuel injection control device, and the like. The fuel injection system 100 is mounted to the engine for the vehicle.

The fuel injection system 100 is a common-rail fuel injection system in which fuel in a fuel tank 40 is drawn by a fuel pump 41, pressure-fed into a common rail 42, stored under high pressure, and distributed and supplied from orifices 42a of the common rail 42 to the fuel injection valves 10 (#1 to #4) of the respective cylinders via fuel pipes 42b. The plurality of fuel injection valves 10 (#1 to #4) successively perform fuel injections in a preset order. Because a plunger pump is used as the fuel pump 41, the fuel is pressure-fed in synchronization with reciprocation of a plunger. In the present embodiment, the common rail 42 corresponds to "an accumulator vessel".

Each of the fuel injection valves 10 includes a body 11, a valve element 12 having a needle shape, an actuator 13, and the like, which will be described below. The body 11 has a high-pressure passage 11a formed in itself and an injection hole 11b that injects fuel. The valve element 12 is housed in the body 11 and opens and closes the injection hole 11b.

A back pressure chamber 11c that applies back pressure to the valve element 12 is formed in the body 11 and the high-pressure passage 11a and a low-pressure passage 11d are connected to the back pressure chamber 11c. A control valve 14 switches between connection and disconnection of the high-pressure passage 11a and the low-pressure passage 11d to and from the back pressure chamber 11c. When the actuator 13 such as an electromagnetic coil and a piezoelectric element is energized to drive and push the control valve 14 downward in FIG. 1, the back pressure chamber 11c communicates with the low-pressure passage 11d and a fuel pressure in the back pressure chamber 11c reduces. As a result, the back pressure applied to the valve element 12 reduces and the valve element 12 is lifted up (driven to open). In this way, a seat surface 12a of the valve element 12 is unseated from the seat surface 11e of the body 11 and the fuel is injected from the injection hole 11b.

On the other hand, when the actuator 13 is de-energized to drive the control valve 14 upward in FIG. 1, the back pressure chamber 11c communicates with the high-pressure passage 11a and the fuel pressure in the back pressure chamber 11c increases. As a result, the back pressure applied to the valve element 12 increases and the valve element 12 is lifted down (driven to close). In this way, the seat surface 12a of the valve element 12 is seated on the seat surface 11e of the body 11 and the fuel injection from the injection hole 11b is stopped.

Therefore, the ECU 30 controls the energization of the actuator 13 to thereby control driving of the valve element 12 for opening and closing. In this way, the high-pressure fuel supplied from the common rail 42 to the high-pressure passage 11a is injected from the injection hole 11b according to the driving of the valve element 12 for opening and closing.

The pressure sensor 20 is mounted to each of the fuel injection valves 10 and detects a pressure of the fuel supplied to the fuel injection valve 10. The pressure sensor 20 includes a stem 21 (strain body) and a pressure sensor element 22, which will be described below. The stem 21 is mounted to the body 11 and a diaphragm unit 21a formed in the stem 21 is elastically deformed under the pressure of the high-pressure fuel flowing through the high-pressure passage 11a. The pressure sensor element 22 is mounted to the diaphragm unit 21a and outputs a pressure detection signal to the ECU 30 according to an elastic deformation amount of the diaphragm unit 21a.

The ECU 30 calculates a target injection state (e.g., the number of stages of injection, an injection start time, an injection end time, and an injection amount) based on an operated amount of an accelerator pedal, an engine load, an engine revolution speed, and the like. For example, the ECU 30 stores an injection state map in which optimum injection states corresponding to the engine loads and the engine revolution speeds are stored. The ECU 30 calculates the target injection state based on the current engine load and engine revolution speed and with reference to the injection state map. The ECU 30 generates a drive signal Sm (see (a) in FIG. 2) for realizing a target injection amount Jk corresponding to the calculated target injection state and outputs the drive signal Sm to the fuel injection valve 10 to thereby control the driving of the fuel injection valve 10.

Figure 2:
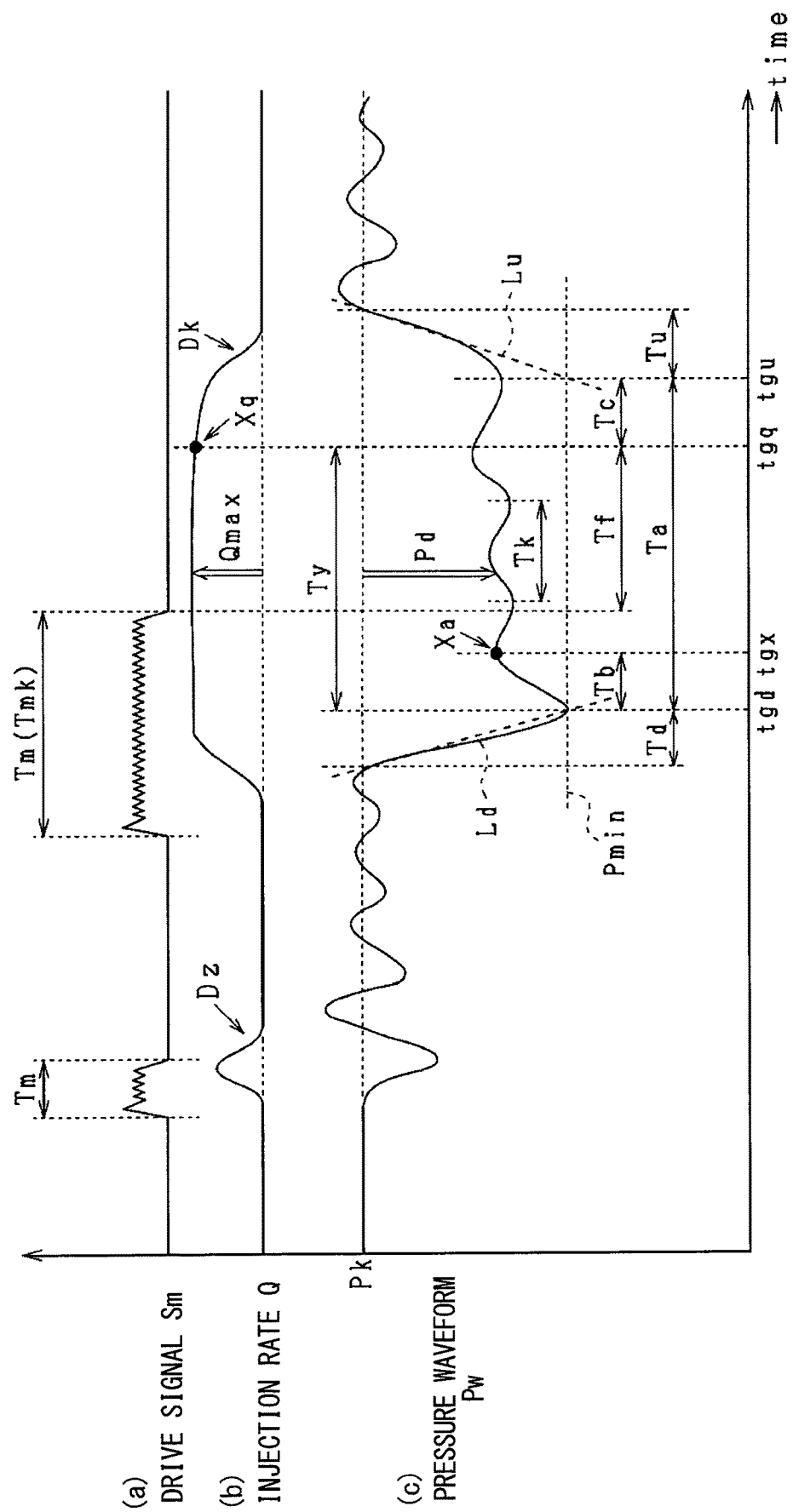
FIG. 2 is a time chart showing (a) a drive signal, (b) an injection rate, and (c) a pressure waveform in a first embodiment.

The ECU 30 detects change in the fuel pressure as a pressure waveform Pw (see (c) in FIG. 2) based on the detection value of the pressure sensor 20 and calculates a maximum injection rate Qmax of the fuel (see (b) in FIG. 2) based on a pressure decrease amount of the fuel caused by a target injection. The pressure decrease amount is a decrease amount of the pressure from a predetermined reference pressure value Pk and the reference pressure value Pk will be described later.

The pressure waveform Pw changes due to disturbances other than the target injection. The disturbances include pressure pulsation caused by a preceding injection of a multi-stage injection having a plurality of stages of injections and valve-opening pulsation caused by opening of the fuel injection valve 10, for example. Therefore, even if the time when the pressure value of the supplied fuel is substantially constant on the pressure waveform Pw is intended to be selected, an actual pressure value of the supplied fuel varies. Therefore, when the instantaneous pressure decrease amount is acquired and the maximum injection rate Qmax is calculated from the acquired instantaneous pressure decrease amount, the acquired pressure decrease amount changes depending on the time when the pressure decrease amount is acquired and it is impossible to calculate the maximum injection rate Qmax with precision.

To solve the above-described problem, the ECU 30 in the present embodiment performs injection control processing. The injection control processing is processing for calculating the fuel pressure decrease amount Pd corresponding to the maximum injection rate Qmax of the fuel of the target injection (hereinafter referred to as "corresponding pressure decrease amount") based on an integral value obtained by integrating the fuel pressure decrease amount due to the target injection in an integration interval Tf where influences of disturbances on the fuel pressure decrease due to the target injection can be suppressed. In this way, it is possible to properly calculate the corresponding pressure decrease amount Pd by suppressing the change.

In the present embodiment, the injection control processing is performed after initial injection amount acquisition processing. The initial injection amount acquisition processing and the injection control processing will be described below in this order.

First, the initial injection amount acquisition processing will be described. The initial injection amount acquisition processing is processing for acquiring an initial maximum injection rate QAmax which is a maximum injection rate Qmax in an initial state before aged deterioration (change) of the fuel injection valve 10. The initial injection amount acquisition processing is performed by use of a dedicated injection rate acquisition device 60 (see FIG. 3) in a preshipment inspection of the fuel injection valve 10, for example, before the fuel injection valve 10 is mounted to the engine.

Figure 3:
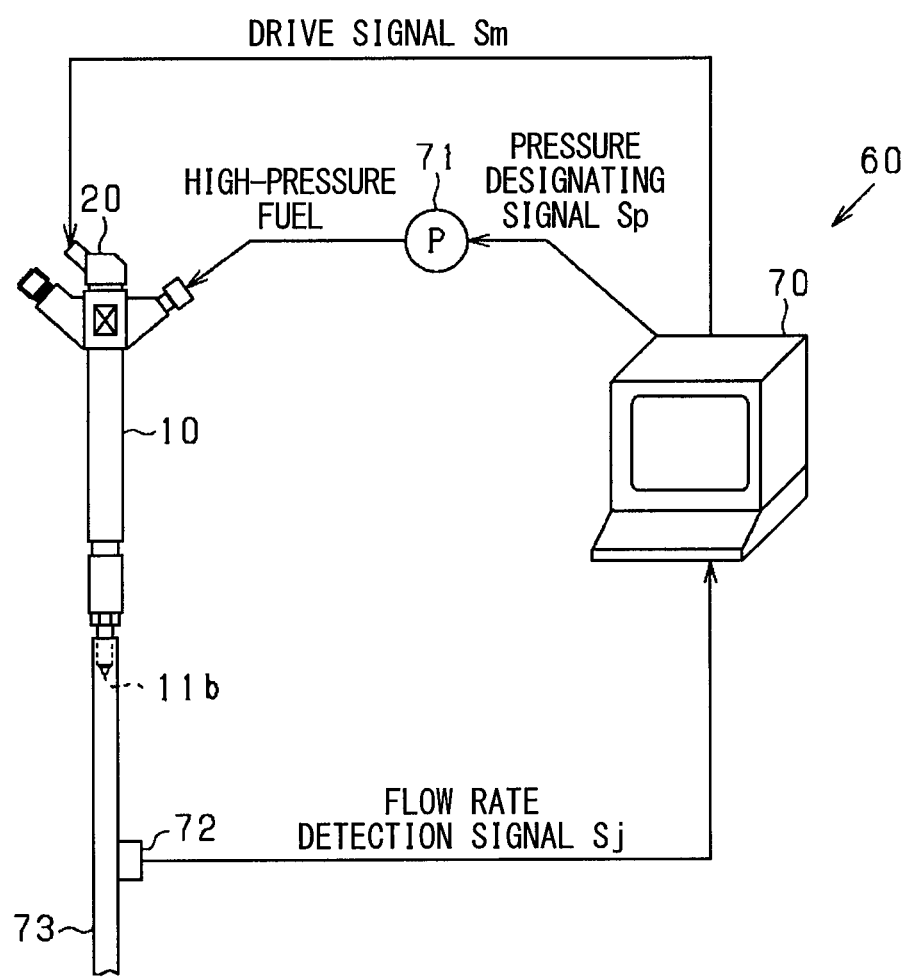
FIG. 3 is a schematic view of a configuration of an injection rate acquisition device.

As shown in FIG. 3, the injection rate acquisition device 60 includes a control device 70, a fuel pump 71 for inspection, a flow rate sensor 72, and the like, which will be described below. The control device 70 generates a drive signal Sm and outputs the drive signal Sm to the fuel injection valve 10. The control device 70 outputs a pressure designating signal Sp to the fuel pump 71 for the inspection to designate an arbitrary designated pressure from a plurality of designated pressures. The fuel pump 71 for the inspection supplies the fuel to the fuel injection valve 10 at the designated pressure designated by use of the pressure designating signal Sp. The flow rate sensor 72 is mounted to a pipe 73 extending from a tip end portion of the fuel injection valve 10 in which the injection hole 11b is formed. The flow rate sensor 72 detects a flow rate of the fuel injected from the fuel injection valve 10 and flowing through the pipe 73 and outputs a flow rate detection signal Sj to the control device 70. The control device 70 calculates an injection rate Q which is an injection amount of the fuel injection valve 10 per unit time based on the detection value of the flow rate sensor 72 and acquires the maximum value of the injection value Q as the initial maximum injection rate QAmax. The fuel pump 71 for the inspection is a pump capable of supplying high-pressure fuel necessary for the fuel injection valve 10. Therefore, in the initial injection amount acquisition processing, the sufficiently high-pressure fuel is supplied to the fuel injection valve 10 as in the case in which the common rail 42 is connected to the fuel injection valve 10.

Figure 4:
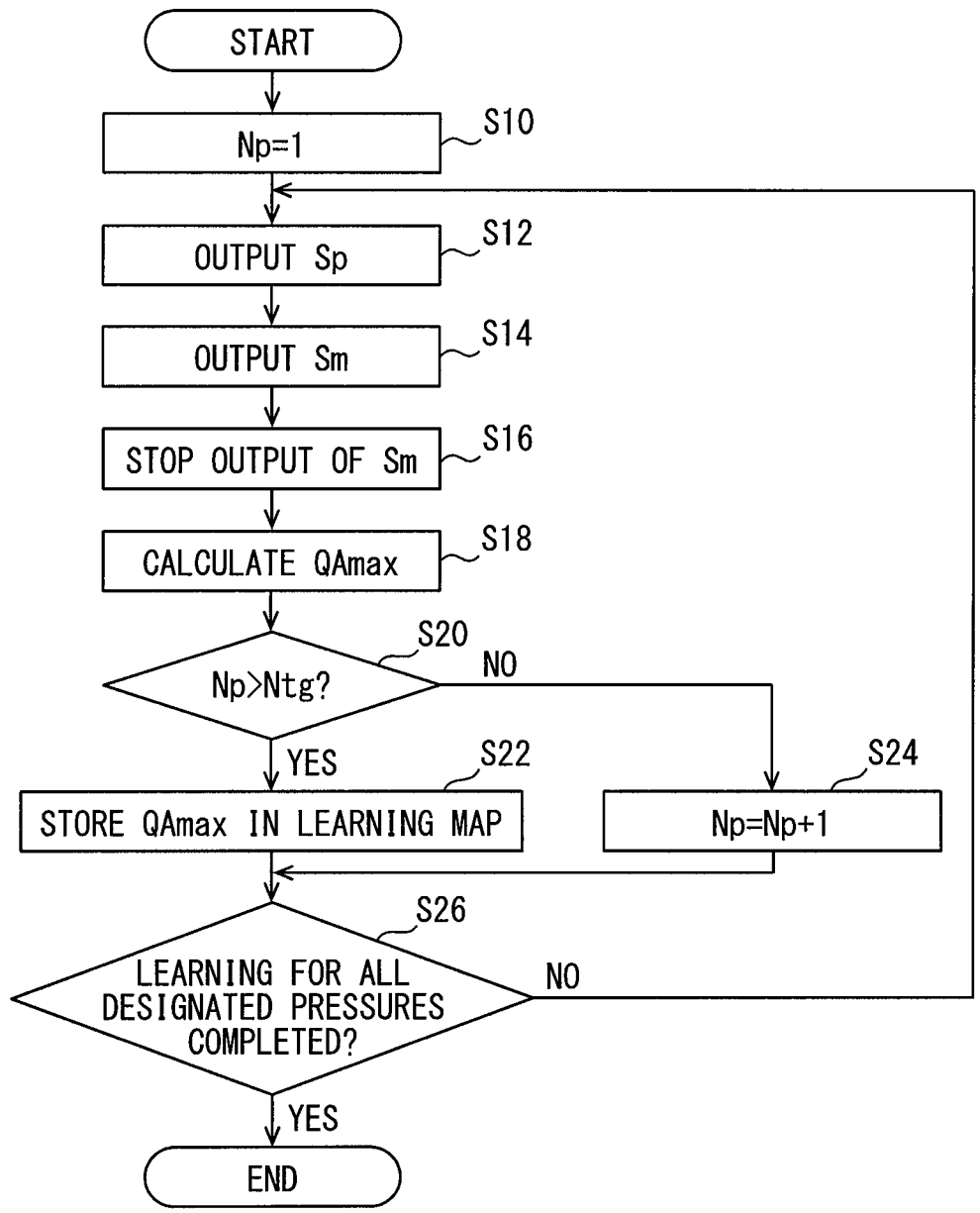
FIG. 4 is a flowchart showing a procedure of initial injection amount acquisition processing.

FIG. 4 is a flowchart showing a procedure of the initial injection amount acquisition processing. When the control device 70 starts the initial injection amount acquisition processing, the control device 70 first sets the number Np (Np: natural number) of injections to "1" in step S10. The control device 70 has the number Np of injections for each of the designated pressures and sets all of the numbers Np of injections to "1" in step S10.

In step S12, the control device 70 outputs the pressure designating signal Sp to the fuel pump 71 for the inspection. Next, the control device 70 outputs the drive signal Sm to the fuel injection valve 10 in step S14 and ends the output of the drive signal Sm in step S16. As a result, the fuel injection valve 10 is driven to inject the fuel over an output interval of the drive signal Sm. Hereinafter the output interval of the drive signal Sm will be referred to as "drive interval Tm" of the fuel injection valve 10. The flow rate sensor 72 detects the flow rate of the fuel flowing through the pipe 73 over the drive interval Tm and a predetermined interval after the driven interval Tm.

In step S18, the control device 70 calculates the initial maximum injection rate QAmax based on the detection value of the flow rate sensor 72. Next, in step S20, the control device 70 determines whether the number Np of injections corresponding to the designated pressure designated in step S12 is larger than a predetermined specified number Ntg.

In a case of an affirmative determination in step S20, the control device 70 calculates, in step S22, an average value of the Np initial maximum injection rates QAmax calculated in step S18 and stores the average value as the initial maximum injection rate QAmax in a learning map in an initial state while relating the average value to the designated pressure designated in step S12. On the other hand, in a case of a negative determination in step S20, the control device 70 increases, in step S24, the number Np of injections corresponding to the designated pressure designated in step S12 by 1.

In next step S26, the control device 70 determines whether the initial maximum injection rate QAmax is learned for every designated pressure. In a case of a negative determination in step S26, the control device 70 returns to step S12. On the other hand, in a case of an affirmative determination in step S26, the control device 70 ends the initial injection amount acquisition processing.

Next, the injection control processing will be described. The ECU 30 repeatedly performs the injection control processing every predetermined time during driving of the engine.

Figure 5:
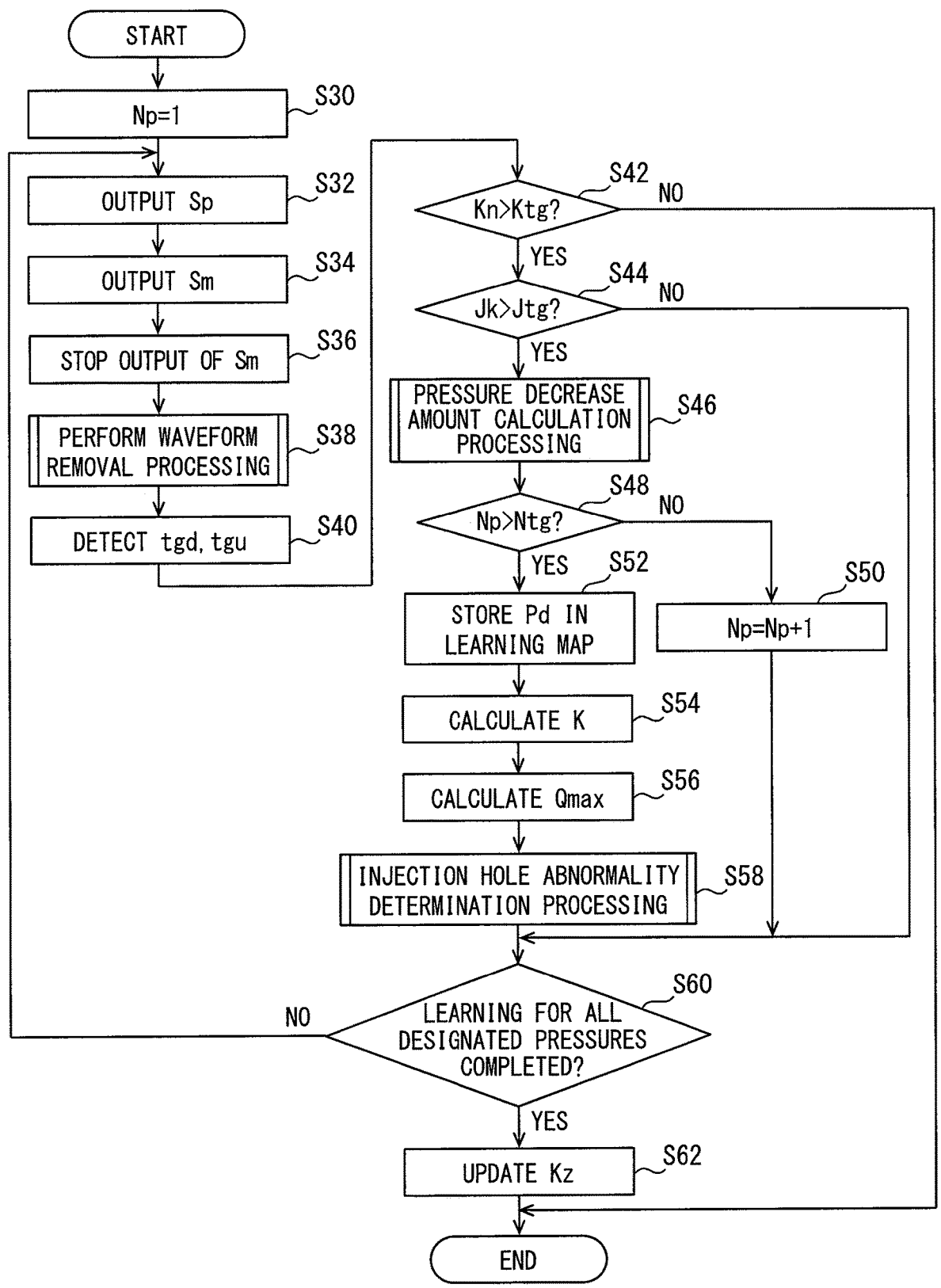
FIG. 5 is a flowchart showing a procedure of injection control processing.

FIG. 5 is a flowchart showing a procedure of the injection control processing. When the ECU 30 starts the injection control processing, the ECU 30 first sets the number Np of injections to "1" in step S30. In step S32, the ECU 30 outputs the pressure designating signal Sp to the fuel pump 71 for the inspection. Next, the ECU 30 outputs the drive signal Sm to the fuel injection valve 10 in step S34 and ends the output of the drive signal Sm in step S36.

As shown in FIG. 2, the ECU 30 performs the multi-stage injection including a plurality of injections of the fuel in one combustion cycle in order to suppress noise and exhaust emission and outputs the drive signal Sm for the preceding injection Dz and the drive signal Sm for a succeeding injection Dk following the preceding injection Dz. In the present embodiment, the ECU 30 regards the succeeding injection Dk as the target injection and calculates the corresponding pressure decrease amount Pd of the succeeding injection Dk.

In step S38, the ECU 30 performs waveform removal processing. The waveform removal processing includes non-injecting cylinder waveform removal processing and preceding pulsation waveform removal processing.

The non-injecting cylinder waveform removal processing is processing for detecting non-injecting cylinder waveforms included in the pressure waveform Pw before the preceding injection Dz and subtracting the non-injecting cylinder waveforms from the pressure waveform Pw. The non-injecting cylinder waveforms are generated by transmission of pressure pulsation, caused by injections of the fuel injection valves 10 (#2 to #4) other than the target fuel injection valve 10 (#1), to the target fuel injection valve 10 via the common rail 42. A substantially constant pressure value of the pressure waveform Pw obtained by subtracting the non-injecting cylinder waveforms from the pressure waveform Pw before the preceding injection Dz is a reference pressure value Pk.

The preceding pulsation waveform removal processing is processing for calculating a model waveform obtained by modeling a pressure pulsation waveform generated by the preceding injection Dz (hereinafter merely referred to as "model waveform") and subtracting the model waveform from the pressure waveform Pw after the preceding injection Dz. As the model waveform, it is possible to employ a waveform of vibration in a specified cycle (period) Tk and with an amplitude reducing as a time elapsed since the preceding injection Dz increases as shown in Expressions 1, 2, for example. In the present embodiment, the preceding pulsation waveform removal processing out of the pieces of processing in step S38 corresponds to "a waveform processing section".

$$F(t) = \sum e^{-kt} A\sin(wt + \theta) \quad \text{[Expression 1]}$$

$$w = \frac{2\pi}{Tk} \quad \text{[Expression 2]}$$

In next step S40, the ECU 30 detects a pressure decrease end time tgd and a pressure increase start time tgu of the succeeding injection Dk. As shown in FIG. 2, the ECU 30 first sets a decrease interval Td where the pressure decreases as the fuel injection rate Q increases and an increase interval Tu where the pressure increases as the fuel injection rate decreases on the pressure waveform Pw of the succeeding injection Dk. In the present embodiment, the interval where the pressure waveform Pw decreases monotonically from the reference pressure value Pk as the fuel injection rate Q increases is set as the decrease interval Td and the interval where the pressure waveform Pw increases monotonically to the reference pressure value Pk as the fuel injection rate Q decreases is set as the increase interval Tu.

Next, the ECU 30 calculates a decrease approximation line Ld obtained by linear approximation of the pressure waveform Pw in the decrease interval Td and an increase approximation line Lu obtained by linear approximation of the pressure waveform Pw in the increase interval Tu. For the linear approximation of the pressure waveform Pw, it is possible to use a known linear approximation calculation method.

Lastly, the ECU 30 detects a minimum pressure value Pmin which is a pressure value detected by the pressure sensor 20 at the pressure decrease end time tgd and detects a time when the decrease approximation line Ld reaches the minimum pressure value Pmin as the pressure decrease end time tgd. The ECU 30 also detects a time when the increase approximation line Lu reaches the minimum pressure value Pmin as the pressure increase start time tgu.

In next step S42, the ECU 30 detects a current travel distance of a vehicle and determines whether a travel distance Kn added to a travel distance Kz at a time when learning of the corresponding pressure decrease amount Pd ends the last time is longer than a predetermined specified travel distance Ktg. In a case of a negative determination in step S42, the ECU 30 ends the injection control processing. In a case of an affirmative determination in step S42, the ECU 30 goes to step S44.

In step S44, the ECU 30 determines whether the target injection amount Jk after the succeeding injection Dk is larger than a predetermined specified injection amount Jtg. The specified injection amount Jtg is set to an injection amount with which the fuel injection rate Q of the fuel injection valve 10 reaches the maximum injection rate Qmax. In a case of a negative determination in step S44, the ECU 30 goes to step S60. In a case of an affirmative determination in step S44, on the other hand, the ECU 30 goes to step S46 and performs pressure decrease amount calculation processing for calculating the corresponding pressure decrease amount Pd.

Figure 6:
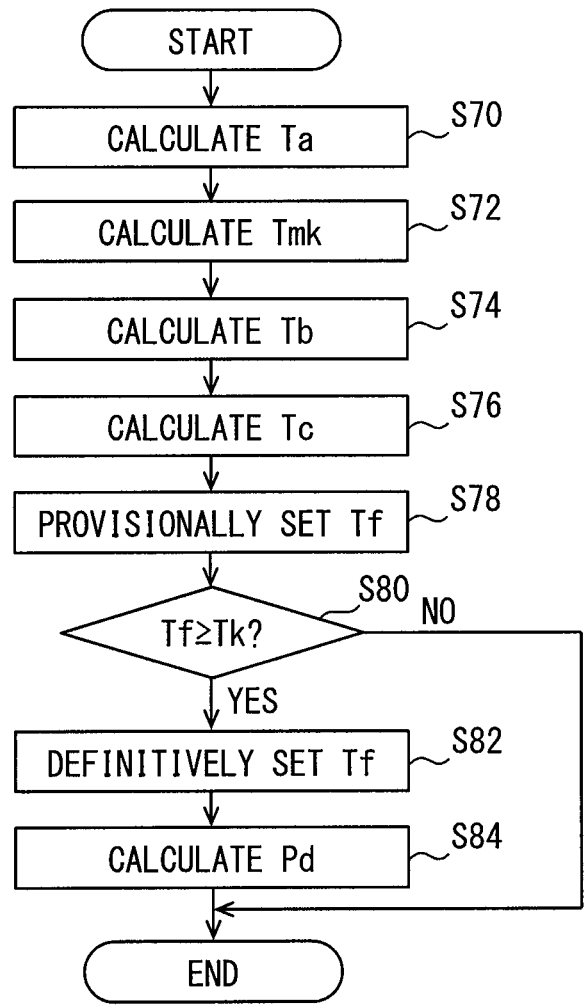
FIG. 6 is a flowchart showing a procedure of pressure decrease amount calculation processing in the first embodiment.

FIG. 6 is a flowchart showing a procedure of the pressure decrease amount calculation processing. When the ECU 30 starts the pressure decrease amount calculation processing, the ECU 30 first calculates a reference interval Ta in step S70. As shown in FIG. 2, the ECU 30 calculates the reference interval Ta between the pressure decrease end time tgd and the pressure increase start time tgu detected in step S40. In the present embodiment, the processing in step S70 corresponds to "a reference interval calculation section".

In step S72, the ECU 30 calculates the drive interval Tmk for the succeeding injection Dk. As shown in FIG. 2, the ECU 30 calculates the output interval for which the drive signal Sm for the succeeding injection Dk is output to the fuel injection valve 10 as the drive interval Tmk.

In step S74, the ECU 30 calculates an opening disturbance interval Tb for which an influence of the valve-opening pulsation is great. As shown in FIG. 2, the ECU 30 calculates an interval between the pressure decrease end time tgd and a local maximum time tgx as the opening disturbance interval Tb, the local maximum time tgx corresponding to a first local maximum point Xa of the pressure waveform Pw generated after the decrease interval Td as a result of opening of the fuel injection valve 10.

In step S76, the ECU 30 calculates an injection rate decrease interval Tc for the succeeding injection Dk. In the common-rail fuel injection system, as a result of continuation of the succeeding injection Dk, the fuel injection rate Q decreases from the maximum injection rate Qmax due to pressure decrease in the common rail 42.

A decrease point Xq at which the fuel injection rate Q starts to decrease from the maximum injection rate Qmax can be set in advance from a capacity of the common rail 42, an injection pressure of the fuel injection valve 10, and the like. In the present embodiment, a decrease time tgq corresponding to the decrease point Xq is set at a time when a predetermined specified time Ty has elapsed since the pressure decrease end time tgd. The ECU 30 calculates an interval between the decrease time tgq and the pressure increase start time tgu as an injection rate decrease interval Tc. In the present embodiment, the decrease time tgq corresponds to "a predetermined time".

In step S78, the ECU 30 provisionally sets the integration interval Tf in which the pressure decrease amount is integrated in order to calculate the corresponding pressure decrease amount Pd. As shown in FIG. 2, the ECU 30 provisionally sets an interval obtained by excluding the drive interval Tmk, the opening disturbance interval Tb, and the injection rate decrease interval Tc calculated in steps S72 to S76 from the reference interval Ta calculated in step S70 as the integration interval Tf.

In step S80, the ECU 30 determines whether a length of the integration interval Tf provisionally set in step S78 is a length equal to or longer than one specified cycle Tk of the pressure pulsation waveform generated by the preceding injection Dz (hereinafter merely referred to as "specified cycle Tk"). In a case of a negative determination in step S70, the ECU 30 ends the pressure decrease amount calculation processing. In a case of an affirmative determination in step S80, on the other hand, the ECU 30 definitively sets the provisionally-set integration interval Tf in step S82 and goes to step S84. In the present embodiment, the processing in step S82 corresponds to "an integration interval setting section".

In step S84, the ECU 30 calculates the corresponding pressure decrease amount Pd by using the integration interval Tf set in step S82 and ends the pressure decrease amount calculation processing. The ECU 30 calculates the corresponding pressure decrease amount Pd in the succeeding injection Dk by integrating the fuel pressure decrease amount due to the succeeding injection Dk in the integration interval Tf and dividing the calculated integral value by the length of the integration interval Tf. In other words, the ECU 30 calculates an average value of the fuel pressure decrease amounts in the integration interval Tf as the corresponding pressure decrease amount Pd. In the present embodiment, the processing in step S84 corresponds to "a decrease amount calculation section".

Referring back to FIG. 5, after ending the pressure decrease amount calculation processing in step S46, the ECU 30 determines, in step S48, whether the number Np of injections corresponding to the designated pressure designated in step S32 is larger than the specified number Ntg.

In a case of a negative determination in step S48, the ECU 30 increases, in step S50, the number Np of injections corresponding to the designated pressure designated in step S32 by 1 and goes to step S60. In a case of an affirmative determination in step S48, on the other hand, the ECU 30 calculates, in step S52, an average value of the Np corresponding pressure decrease amounts Pd calculated in step S46. Then, the ECU 30 stores the average value as the corresponding pressure decrease amount Pd in the learning map in a driving state while relating the corresponding pressure decrease amount Pd to the designated pressure designated in step S32 and the current travel distance of the vehicle.

In next step S54, the ECU 30 calculates an aged change index K indicating a degree to which the corresponding pressure decrease amount Pd changes as the fuel injection valve 10 deteriorates over time by using the learning map in the driving state. The ECU 30 first selects the corresponding pressure decrease amount Pd that is related to the designated pressure designated in step S32 and related to the shortest travel distance in the learning map in the driving state as an initial corresponding pressure decrease amount PAd. For example, the ECU 30 selects the corresponding pressure decrease amount Pd at a beginning of use of the vehicle as the initial corresponding pressure decrease amount PAd.

Next, the ECU 30 calculates the aged change index K by dividing the corresponding pressure decrease amount Pd learned in the current injection control processing by the initial corresponding pressure decrease amount PAd. In the present embodiment, the processing in step S54 corresponds to "a change index calculation section".

In next step S56, the ECU 30 calculates the maximum injection rate Qmax by using the aged change index K. In the ECU 30, the learning map in the initial state learned by the control device 70 (see FIG. 3) of the injection rate acquisition device 60 is stored. The ECU 30 calculates the maximum injection rate Qmax by multiplying the initial maximum injection rate QAmax, which is related to the designated pressure designated in step S32 in the learning map in the initial state, by the aged change index K calculated in step S50. In the present embodiment, the processing in step S56 corresponds to "an injection rate calculation section".

In step S52, the ECU 30 performs injection hole abnormality determination processing for determining abnormality of the fuel injection valve 10 based on the aged change index K. In the present embodiment, the processing in step S52 corresponds to "an abnormality determination section".

Figure 7:
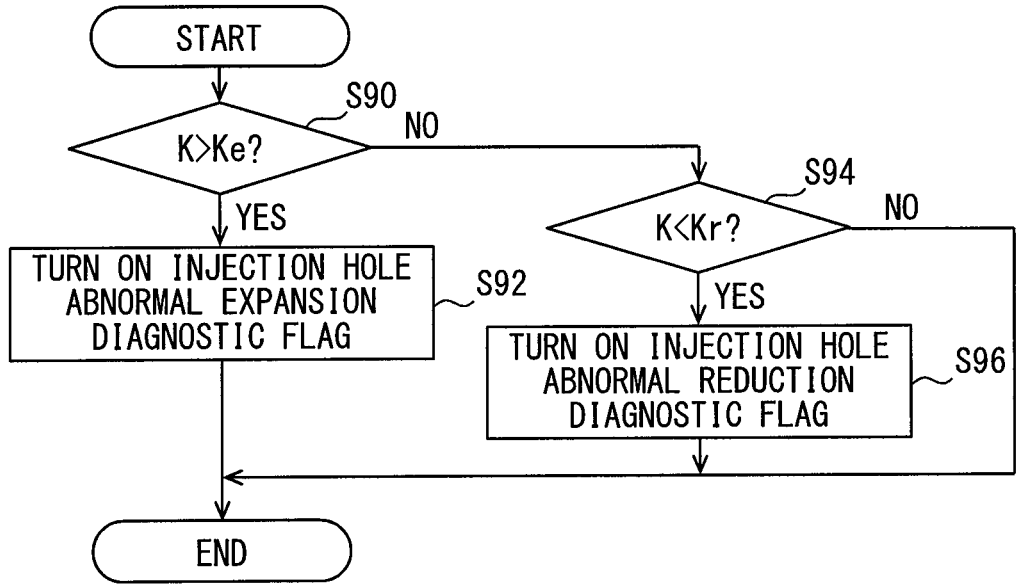
FIG. 7 is a flowchart showing a procedure of injection hole abnormality determination processing.

FIG. 7 is a flowchart showing a procedure of the injection hole abnormality determination processing. When the ECU 30 starts the injection hole abnormality determination processing, the ECU 30 first determines whether the aged change index K calculated in step S50 is larger than an abnormal expansion determination threshold value Ke in step S90. If the aged change index K is larger than the abnormal expansion determination threshold value Ke, an opening sectional area of the injection hole 11b expands over an upper limit value due to wear or the like and the maximum injection rate Qmax increases. As a result, in the engine mounted with the fuel injection valve 10, the increase in the fuel injection amount in one combustion cycle increases noise and vibration.

Therefore, in a case of an affirmative determination in step S90, the ECU 30 turns on an injection hole abnormal expansion diagnostic flag in step S92 to inform a user of the abnormality by using an abnormality warning lamp or the like and ends the injection hole abnormality determination processing. In a case of a negative determination in step S92, the ECU 30 goes to step S94.

In step S94, the ECU 30 determines whether the aged change index K calculated in step S50 is smaller than an abnormal reduction determination threshold value Kr which is smaller than the abnormal expansion determination threshold value Ke. If the aged change index K is smaller than the abnormal reduction determination threshold value Kr, an opening sectional area of the injection hole 11b reduces below a lower limit value due to a fuel deposit or the like and the maximum injection rate Qmax reduces. As a result, in the engine in which the fuel is injected from the fuel injection valve 10, it is necessary to extend the drive interval Tmk for the succeeding injection Dk in order to make up for the decrease in the fuel injection amount in one combustion cycle, which worsens the emission.

Therefore, in a case of an affirmative determination in step S94, the ECU 30 turns on an injection hole abnormal reduction diagnostic flag in step S96 to inform a user of the abnormality by using an abnormality warning lamp or the like and ends the injection hole abnormality determination processing. In a case of a negative determination in step S94, on the other hand, the ECU 30 ends the injection hole abnormality determination processing without turning on the injection hole abnormal expansion diagnostic flag nor the injection hole abnormal reduction diagnostic flag.

Referring back to FIG. 5, after ending the injection hole abnormality determination processing in step S58, the ECU 30 goes to step S60.

In step S60, the ECU 30 determines whether the corresponding pressure decrease amount Pd is learned for every designated pressure. In a case of a negative determination in step S60, ECU 30 returns to step S32. In a case of an affirmative determination in step S60, on the other hand, the ECU 30 updates the travel distance Kz to a current travel distance of the vehicle in step S62 and ends the injection control processing.

Figure 9A:
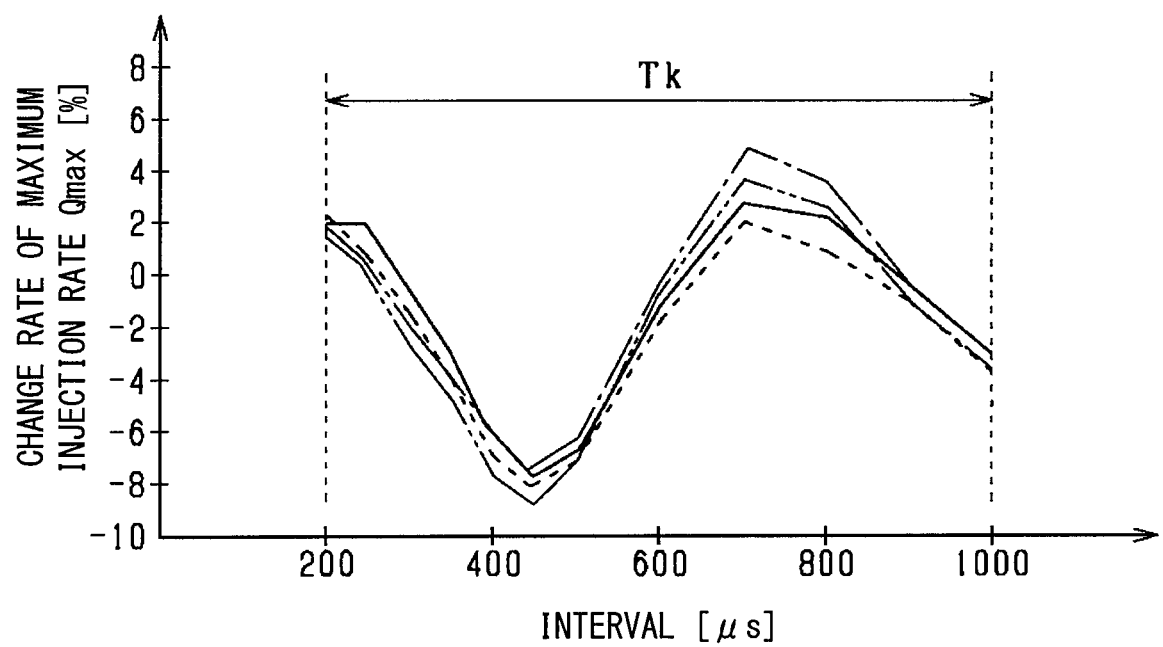
FIG. 9A is a graph showing change rates of maximum injection rates.
Figure 9B:
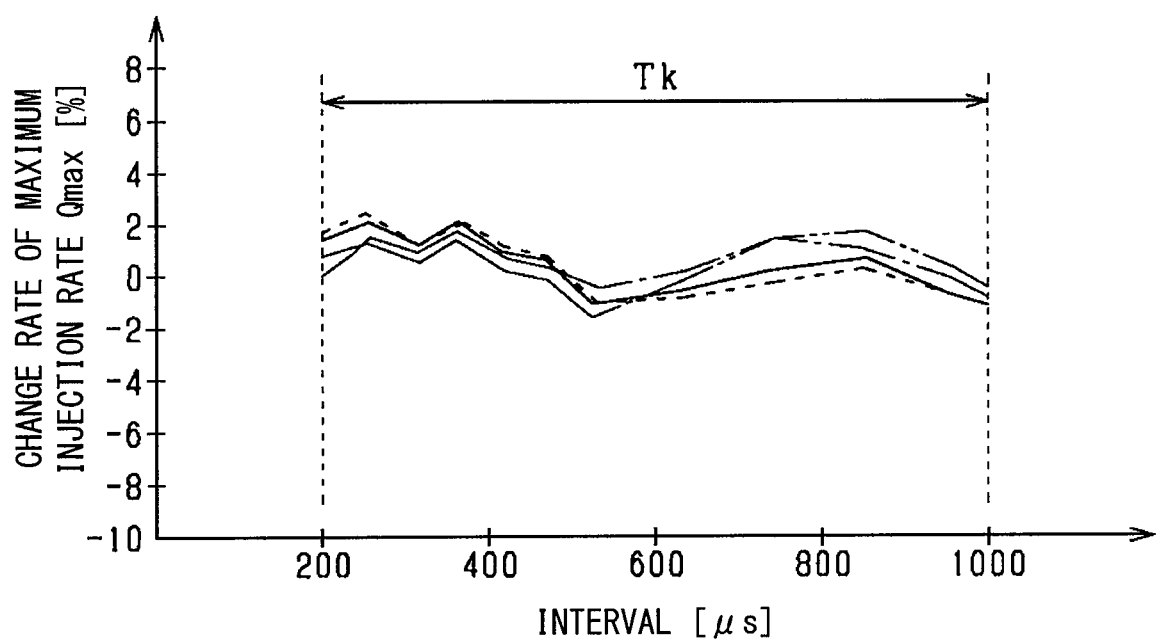
FIG. 9B is a graphs showing change rates of maximum injection rates.

Next, an example of the preceding pulsation waveform removal processing will be described by using FIGS. 8 to 9B. Here, in FIG. 8, (a) shows a pressure waveform Pw before removal of a model waveform, (b) shows the model waveform, and (c) shows a pressure waveform Pw after the removal of the model waveform. (c) in FIG. 8 shows the pressure waveform Pw before the removal of the model waveform in a broken line. FIGS. 9A and 9B are graphs each of which shows a change rate of the maximum injection rate Qmax calculated by use of the pressure waveform Pw after the removal of the model waveform. FIG. 9A shows the maximum injection rate Qmax calculated by use of the instantaneous pressure decrease amount and FIG. 9B shows the maximum injection rate Qmax calculated by use of the corresponding pressure decrease amount Pd.

As shown in (a) in FIG. 8, the pressure waveform Pw before the removal of the model waveform includes the pressure pulsation waveform generated by the preceding injection Dz. Therefore, as shown in (b) in FIG. 8, the influence of the pressure pulsation generated by the preceding injection Dz is suppressed by calculating the model waveform obtained by modeling the pressure pulsation waveform generated by the preceding injection Dz by use of Expression 1 described above and subtracting the model waveform from the pressure waveform Pw before the removal of the model waveform after the end time tgf when the preceding injection Dz ends.

However, there is an error between the pressure pulsation waveform generated by the preceding injection Dz and the model waveform. Causes of the error include an error of a fuel temperature sensor provided to the engine when temperature correction is performed, a manufacturing error of an orifice diameter of the common rail 42, an error caused by variations in fuel density, and the like.

As shown in (c) in FIG. 8, an influence of the pressure pulsation generated by the preceding injection Dz remains on the pressure waveform Pw after the removal of the model waveform. Therefore, as shown in FIG. 9A, if the maximum injection rates Qmax are calculated by use of the instantaneous pressure decrease amounts acquired while changing an interval between the preceding injection Dz and the succeeding injection Dk, the maximum injection rate Qmax changes by 12% at the maximum. The instantaneous pressure decrease amounts are acquired at a specific time within an interval obtained by excluding the drive interval Tmk, the opening disturbance interval Tb, and the injection rate decrease interval Tc from the reference interval Ta by using four samples.

In the present embodiment, the integration interval Tf is set to calculate the corresponding pressure decrease amount Pd and the length of the integration interval Tf is set to be equal to or longer than the length of the one specified cycle Tk. As a result, as shown in FIG. 9B, the change in the maximum injection rate Qmax is suppressed to 4% at the maximum and it is possible to suppress the influence of the pressure pulsation generated by the preceding injection Dz on the corresponding pressure decrease amount Pd.

Figure 10:
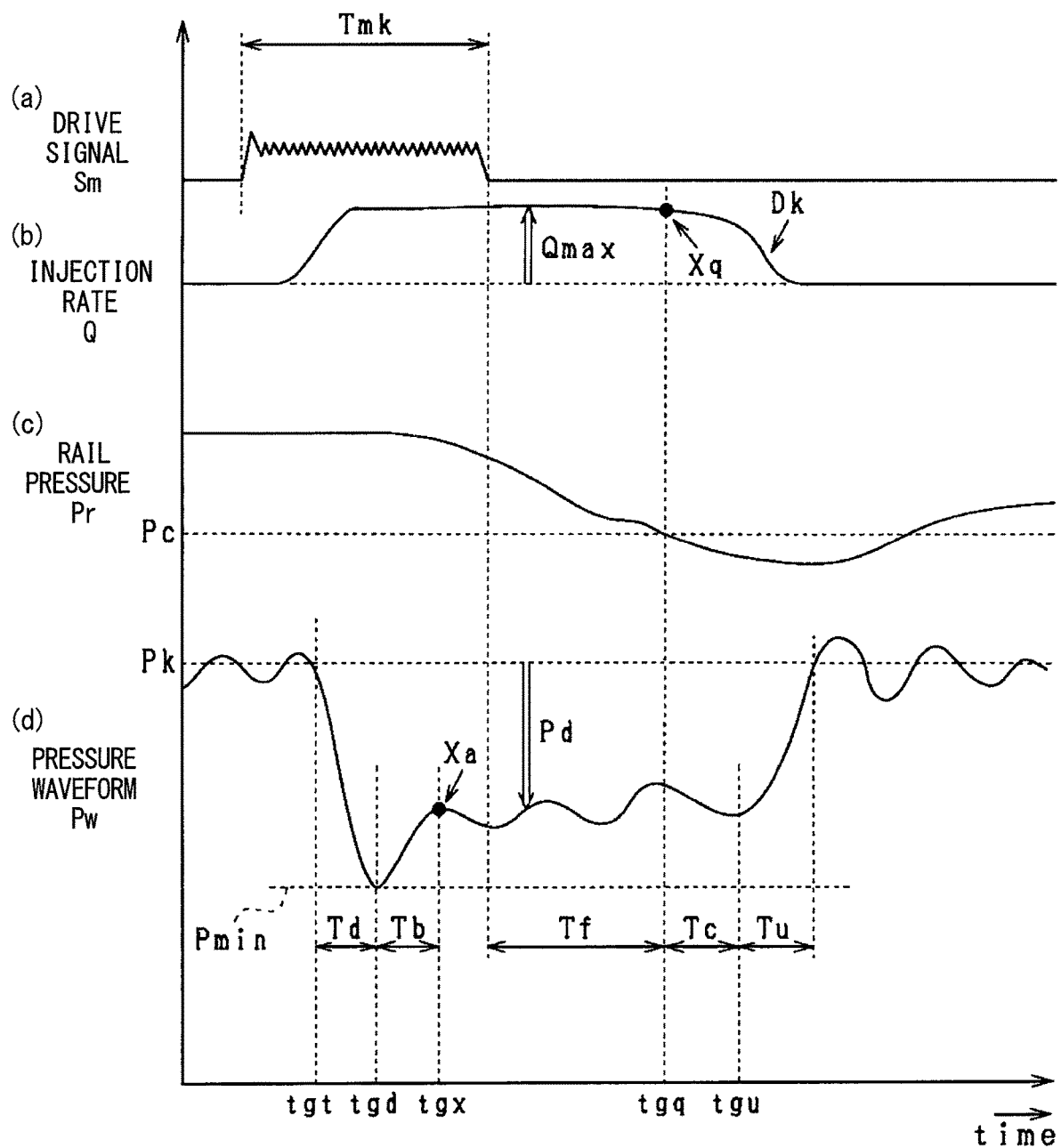
FIG. 10 is a time chart showing (a) a drive signal, (b) an injection rate, and (c) a rail pressure, and (d) a pressure waveform.
Figure 11A:
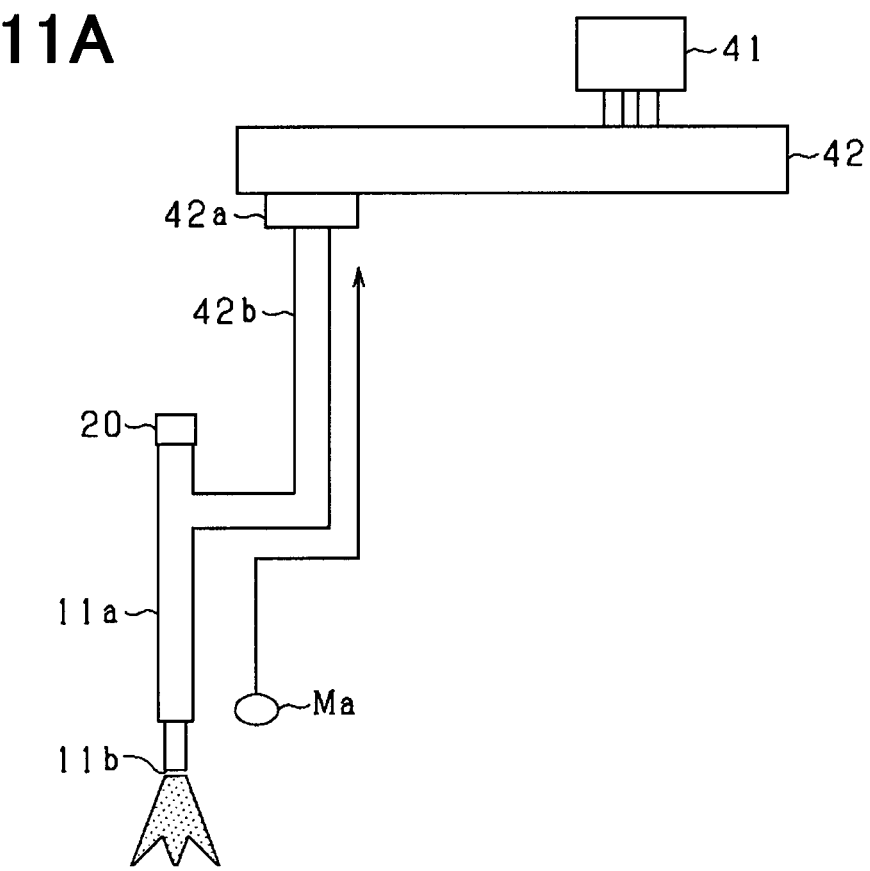
FIG. 11A is a schematic view for explaining a mechanism of generation of valve-opening pulsation.
Figure 11B:
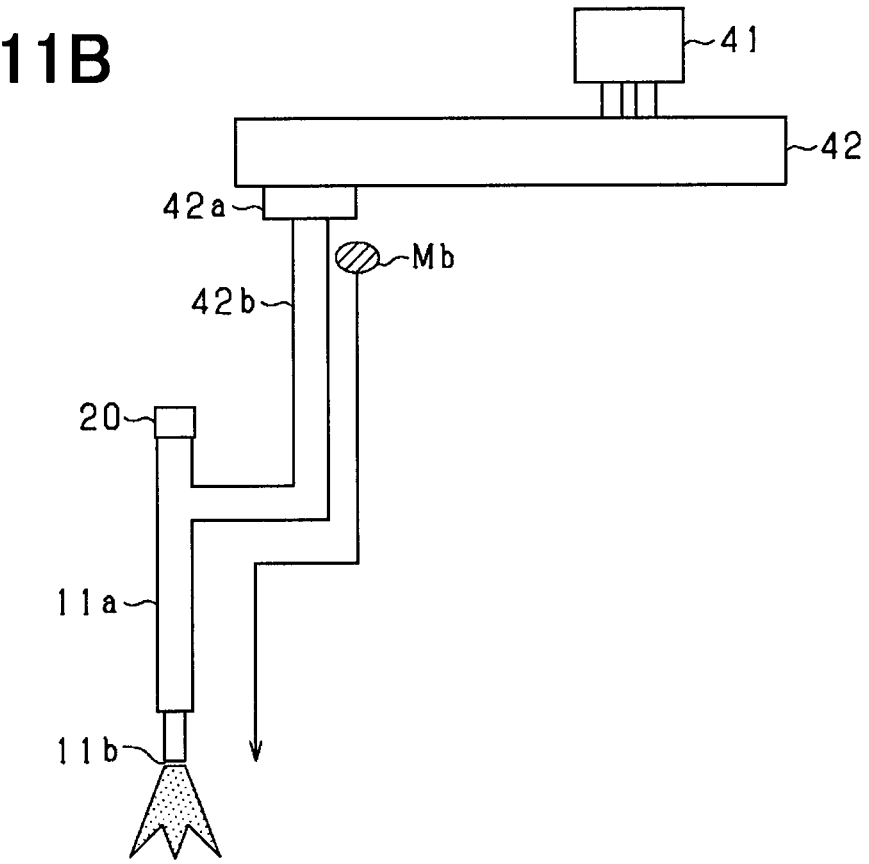
FIG. 11B is a schematic view for explaining a mechanism of generation of valve-opening pulsation.

Next, by using FIGS. 10 and 11, pressure changes in the fuel injection valve 10 and the common rail 42 caused by the succeeding injection Dk will be described by using FIGS. 10 and 11. Here, (a) in FIG. 10 shows the drive signal Sm for the succeeding injection Dk, (b) in FIG. 10 shows the injection rate Q of the fuel by the succeeding injection Dk, (c) in FIG. 10 shows rail pressure Pr which is pressure in the common rail 42, and (d) in FIG. 10 shows the pressure waveform Pw of the succeeding injection Dk. FIGS. 11A and 11B are schematic views for explaining a mechanism of generation of the valve-opening pulsation. FIG. 11A is the schematic view for explaining the pressure change in the decrease interval Td and FIG. 11B is the schematic view for explaining the pressure change in the opening disturbance interval Tb.

When the drive signal Sm for the succeeding injection Dk starts to be output as shown in (a) in FIG. 10, the fuel injection from the injection hole 11*b* of the fuel injection valve 10 starts. When the fuel injection from the injection hole 11*b* starts, pulsation of the fuel pressure decrease (hereinafter referred to as "decrease pulsation Ma") is generated at a portion of the high-pressure passage 11*a* close to the injection hole 11*b* as shown in FIG. 11A. Then, the generated decrease pulsation Ma propagates through the high-pressure passage 11*a* toward the common rail 42. At a reaching time tgt (see (d) in FIG. 10) when the decrease pulsation Ma reaches the portion where the pressure sensor 20 is mounted, the pressure waveform Pw starts to decrease.

Then, at a time when the decrease pulsation Ma reaches the orifice 42*a* of the common rail 42, the high-pressure fuel in the common rail 42 starts to be supplied into the fuel pipe 42*b*. If the fuel starts to be supplied in this manner, pulsation of the fuel pressure increase (increase pulsation Mb) is generated at a portion in the fuel pipe 42*b* close to the orifice 42*a* as shown in FIG. 11B. Then, the generated increase pulsation Mb propagates through the high-pressure passage 11*a* toward the injection hole 11*b*. At the pressure decrease end time tgd when the increase pulsation Mb reaches the portion where the pressure sensor 20 is mounted, the waveform at the injection starts to increase.

Then, at the local maximum time tgx when a flow rate of the fuel supplied from the common rail 42 and a flow rate of the fuel injected from the injection hole 11*b* are balanced at a portion in the high-pressure passage 11*a* close to the pressure sensor 20, the pressure waveform Pw stops increasing.

Therefore, the opening disturbance interval Tb between the pressure decrease end time tgd and the local maximum time tgx includes the valve-opening pulsation waveform caused by the opening of the fuel injection valve 10. In the present embodiment, the opening disturbance interval Tb is excluded from the integration interval Tf. In this way, it is possible to suppress the influence of the valve-opening pulsation on the corresponding pressure decrease amount Pd.

As shown in (c) in FIG. 10, when the high-pressure fuel in the common rail 42 starts to be supplied into the fuel pipe 42*b*, the rail pressure Pr starts to decrease. The longer an injection period of the succeeding injection Dk, the larger the decrease in the rail pressure Pr becomes. At the decrease time tgq when the rail pressure Pr decreases below a predetermined pressure threshold value Pc, the injection rate Q starts to decrease from the maximum injection rate Qmax (see (b) in FIG. 10).

Therefore, it is impossible to accurately calculate the maximum injection rate Qmax by using the pressure decrease amount in the injection rate decrease interval Tc between the decrease time tgq and the pressure increase start time tgu. In the present embodiment, the injection rate decrease interval Tc is excluded from the integration interval Tf. In this way, it is possible to suppress the influence of the decrease in the rail pressure Pr on the corresponding pressure decrease amount Pd.

As shown in (a) in FIG. 10, the pulse signal is used as the drive signal Sm for driving the fuel injection valve 10 in the present embodiment. Because a voltage value of the pulse signal fluctuates, noise may be superimposed on the detection value of the pressure sensor 20 as a result of the fluctuation. Moreover, mechanical vibrations may be caused by movements or collisions of the valve element 12 and the control valve 14 and affect the detection value of the pressure sensor 20.

Therefore, in the present embodiment, the drive interval Tmk is excluded from the integration interval Tf. In this way, it is possible to suppress the influence of the valve-opening pulsation of the fuel injection valve 10 on the corresponding pressure decrease amount Pd.

According to the above-described present embodiment, the following effects are exerted.

The ECU 30 sets the integration interval Tf in the reference interval Ta, integrates the fuel pressure decrease amount due to the succeeding injection Dk, which is the target injection, in the integration interval Tf, and calculates the corresponding pressure decrease amount Pd corresponding to the maximum injection rate Qmax of the fuel in the succeeding injection Dk based on the calculated integral value. The integration interval Tf is set to the integration interval where the influence of the disturbance on the fuel pressure decrease due to the succeeding injection Dk can be suppressed. In this way, it is possible to properly calculate the corresponding pressure decrease amount Pd by suppressing the change in the fuel pressure decrease amount due to the succeeding injection Dk.

To put it concretely, the length of the integration interval Tf is set to be equal to or longer than the length of the one specified cycle Tk. If the length of the integration interval Tf is equal to or longer than the length of the one specified cycle Tk, the local maximum point and a local minimum point of the pressure pulsation waveform are included in the integration interval Tf. Therefore, by integrating the fuel pressure decrease amount due to the succeeding injection Dk in the integration interval Tf, the influences of the local maximum point and the local minimum point can cancel each other out. Therefore, as compared with a structure in which a length of an integration interval Tf is shorter than one specified cycle Tk and influences of a local maximum point and a local minimum point cannot cancel each other out, it is possible to suppress the influence of the pressure pulsation generated by the preceding injection Dz on the corresponding pressure decrease amount Pd.

Although the pressure pulsation generated by the preceding injection Dz is suppressed by the preceding pulsation waveform removal processing in the present embodiment, the model waveform obtained by modeling the pressure pulsation waveform generated by the preceding injection Dz includes the error. Therefore, the influence of the pressure pulsation generated by the preceding injection Dz remains on the pressure waveform Pw after the subtraction of the model waveform. In the present embodiment, by setting the length of the integration interval Tf to the length equal to or longer than the one specified cycle, it is possible to suppress the influence of the error on the corresponding pressure decrease amount Pd.

Furthermore, the opening disturbance interval Tb between the pressure decrease end time tgd and the local maximum time tgx is excluded from the integration interval Tf. In this way, it is possible to suppress the influence of the valve-opening pulsation, generated by the flow of the fuel flowing from the common rail 42 into the fuel injection valve 10, on the corresponding pressure decrease amount Pd.

Moreover, the injection rate decrease interval Tc between the decrease time tgq and the pressure increase start time tgu is excluded from the integration interval Tf. In this way, it is possible to suppress the influence of the decrease in the rail pressure Pr on the corresponding pressure decrease amount Pd.

Furthermore, the drive interval Tmk for the succeeding injection Dk is excluded from the integration interval Tf. In this way, it is possible to suppress the influences of the driving of the fuel injection valve 10 such as the drive signal Sm and the noise generated by the driving of the fuel injection valve 10 on the pressure decrease amount.

The ECU 30 calculates the aged change index K from the corresponding pressure decrease amount Pd and calculates the maximum injection rate Qmax based on the calculated aged change index K. Because there is a high correlation between the corresponding pressure decrease amount Pd and the maximum injection rate Qmax, the aged change index K of the corresponding pressure decrease amount Pd indicates an aged change index of the maximum injection rate Qmax. Therefore, even if it is impossible to directly calculate the maximum injection rate Qmax, it is possible to calculate the maximum injection rate Qmax by using the initial maximum injection rate QAmax and the aged change index K.

The ECU 30 calculates the maximum injection rate Qmax based on the calculated aged change index K. The aged change index K indicates a degree of change of the corresponding pressure decrease amount Pd corresponding to the maximum injection rate Qmax due to the aged deterioration. Therefore, by determining the abnormality of the fuel injection valve 10 based on the aged change index K, it is possible to determine the abnormality of the fuel injection valve 10 based on the relative change of the corresponding pressure decrease amount Pd due to the aged deterioration.

The ECU 30 calculates the corresponding pressure decrease amount Pd for each of the specified travel distances Ktg. In this way, it is possible to acquire the aged change index K which is the degree of change of the corresponding pressure decrease amount Pd due to the aged deterioration corresponding to the specified travel distance Ktg.

Second Embodiment

The second embodiment will be described below with a focus on differences from the previous first embodiment and with reference to the drawings.

The present embodiment is different in that waveform removal processing (step S38) in injection control processing does not include preceding pulsation waveform removal processing. In the present embodiment, the waveform removal processing includes only non-injecting cylinder waveform removal processing.

Figure 12:
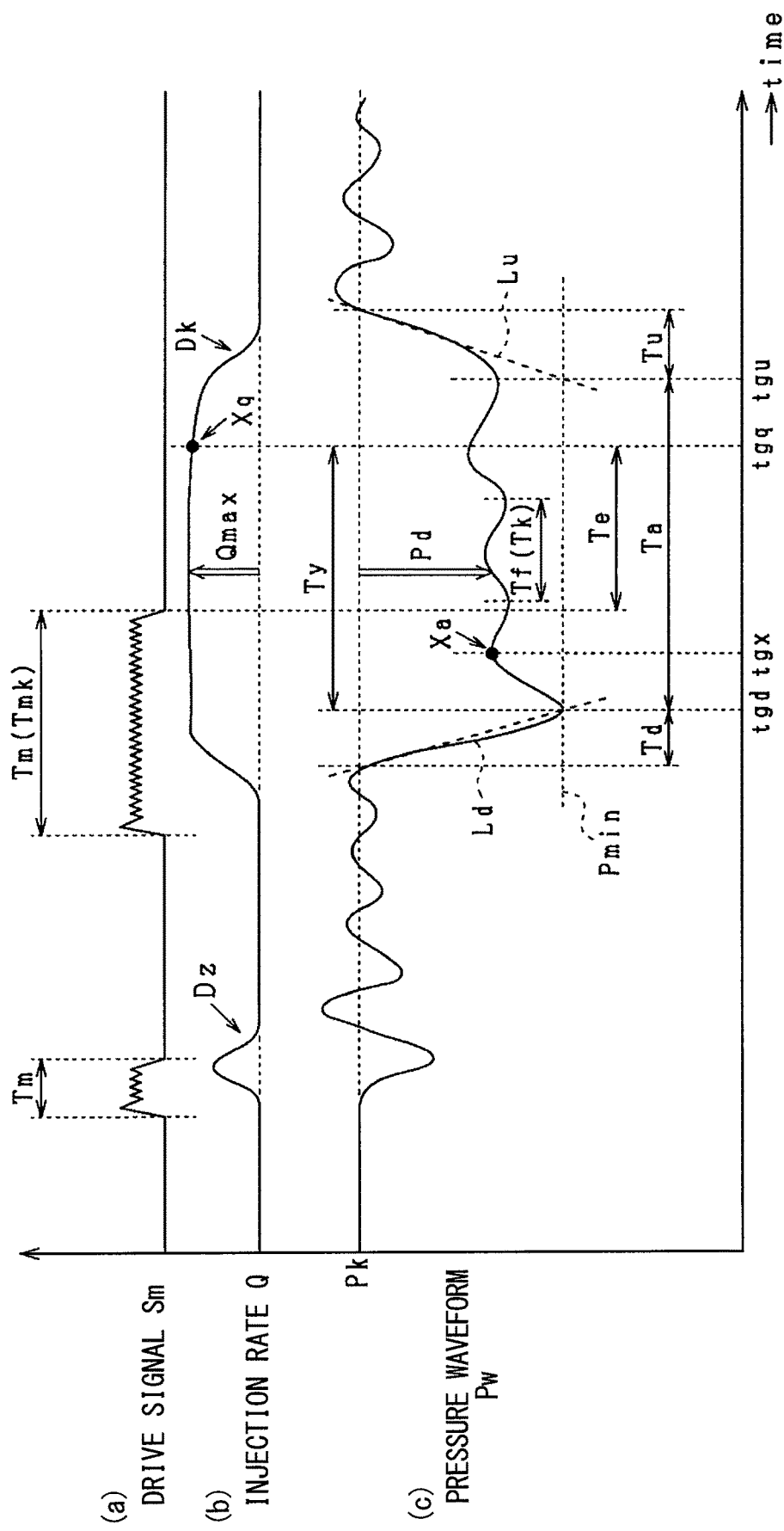
FIG. 12 is a time chart showing (a) a drive signal, (b) an injection rate, and (c) a pressure waveform in a second embodiment.

Moreover, the present embodiment is different in pressure decrease amount calculation processing as shown in FIG. 12. In FIG. 12, the same matters as those shown in FIG. 2 referred to above are provided with the same reference signs and not described for convenience.

Figure 13:
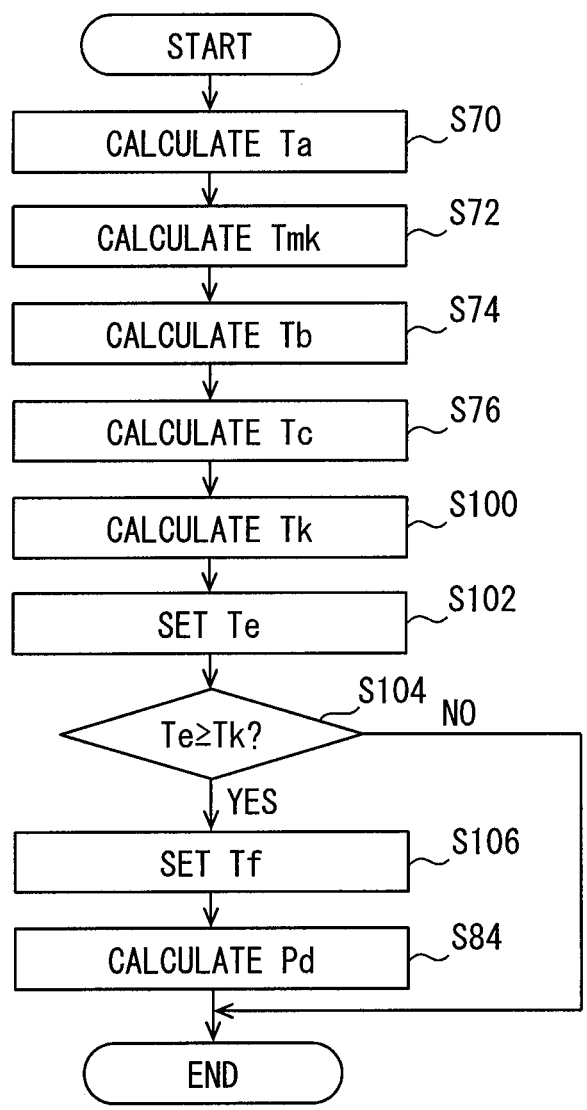
FIG. 13 is a flowchart showing a procedure of pressure decrease amount calculation processing in the second embodiment.

FIG. 13 is a flowchart showing a procedure of pressure decrease amount calculation processing in the present embodiment. After ending calculation of an injection rate decrease interval Tc (in step S76) in the pressure decrease amount calculation processing, an ECU 30 calculates a specified cycle Tk in step S100. The specified cycle Tk can be calculated as an interval between two adjacent local maximum values, for example, on a pressure pulsation waveform generated by a preceding injection Dz.

In next step S102, the ECU 30 sets an interval, obtained by excluding a drive interval Tmk, an opening disturbance interval Tb, and an injection rate decrease interval Tc calculated in steps S72 to S76 from a reference interval Ta calculated in step S70, as a remaining interval Te.

In step S104, the ECU 30 determines whether a length of the remaining interval Te set in step S102 is a length equal to or longer than the one specified cycle Tk. In a case of a negative determination in step S104, the ECU 30 ends the pressure decrease amount calculation processing. In a case of an affirmative determination in step S104, on the other hand, the ECU 30 goes to step S106.

In step S106, the ECU 30 selects an interval having a length of N (N: natural number) specified cycle(s) Tk from the remaining interval Te and sets the selected interval as an integration interval Tf. Therefore, the integration interval Tf is the interval equal to or shorter than the length of the remaining interval Te. In FIG. 12, the interval having the length of the one specified cycle Tk is set as the integration interval Tf.

According to the above-described present embodiment, the following effects are exerted.

The ECU 30 sets the length of the integration interval Tf to the length equal to or longer than the length of N specified cycle(s) Tk. Therefore, the same numbers of local maximum points and local minimum points of the pressure pulsation waveform generated by the preceding injection Dz are included in the integration interval Tf. Therefore, by integrating a fuel pressure decrease amount due to a succeeding injection Dk which is a target injection in the integration interval Tf, influences of the local maximum points and the local minimum points can substantially cancel each other out and it is possible to suitably suppress an influence of the pressure pulsation generated by the preceding injection Dz on a corresponding pressure decrease amount Pd.

Especially because the preceding pulsation waveform removal processing is not performed in the present embodiment, the pressure pulsation generated by the preceding injection Dz remains on a pressure waveform Pw. In the present embodiment, by setting the length of the integration interval Tf to the length of the N specified cycle(s), it is possible to suitably suppress the influence of the pressure pulsation generated by the preceding injection Dz on the corresponding pressure decrease amount Pd without performing the preceding pulsation waveform removal processing.

The present disclosure is not limited to the descriptions of the above-described embodiments and may be carried out in the following manners.

A specified cycle Tk does not necessarily have to be acquired from the model waveform obtained by modeling the pressure pulsation waveform generated by the preceding injection Dz and may be calculated by performing a frequency analysis of a pressure waveform Pw after a preceding injection Dz.

The fuel injection system 100 is not limited to the common-rail fuel injection system used for the diesel engine and may be a delivery-pipe fuel injection system used for a gasoline engine.

Although all of the drive interval Tmk, the opening disturbance interval Tb, and the injection rate decrease interval Tc are calculated in the pressure decrease amount calculation processing in the shown examples, the present disclosure is not limited to the examples and at least part of the intervals may not be calculated. Even if at least part of the intervals is/are not be calculated, the length of the reference interval Ta is equal to or longer than the length of the one specified cycle Tk, which suppresses the change in the fuel pressure decrease amount due to the succeeding injection Dk and makes it possible to properly calculate the corresponding pressure decrease amount Pd.

In the injection control processing, calculation of the maximum injection rate Qmax is not essential and the maximum injection rate Qmax may not be calculated.

The reference interval Ta does not have to be calculated by using the decrease approximation line Ld, the increase approximation line Lu, and the minimum pressure value Pmin. For example, it is possible to calculate an interval between a time, which is a first local minimum point after pressure decreases by a predetermined threshold value or more, and a time, which is a last local minimum point before the pressure increases by a predetermined threshold value or more, on a pressure waveform Pw of a succeeding injection Dk as a reference interval Ta. In this case, the decrease interval Td, the decrease approximation line Ld, the increase interval Tu, the increase approximation line Lu, and the minimum pressure value Pmin do not necessarily have to be calculated.

The calculation of the decrease interval Td and the increase interval Tu is not limited to that in each of the above-described embodiments. For example, a decrease interval Td may be set to a certain interval from a time when a pressure waveform Pw starts to decrease in pressure as a fuel injection rate Q increases and an increase interval Tu may be set to a certain interval from a time when the pressure waveform Pw starts to increase in pressure as the fuel injection rate Q increases.

The fuel injection control device 30 illustrated above is applied to a fuel injection system 100 including a pressure sensor 20 that detects a pressure of fuel supplied to a fuel injection valve 10. The device 30 includes a reference interval calculation section S70 configured to calculate a reference interval Ta between an end time tgd of a decrease interval Td where the pressure decreases as a fuel injection rate Q increases and a start time tgu of an increase interval Tu where the pressure increases as the fuel injection rate Q decreases on a pressure waveform Pw detected by the pressure sensor 20, an integration interval setting section S82 configured to set, in the reference interval Ta, an integration interval Tf where an influence of a disturbance on the fuel pressure decrease due to a target injection Dk is suppressible, and a decrease amount calculation section S84 configured to calculate a corresponding pressure decrease amount Pd, which is an amount of the fuel pressure decrease corresponding to a maximum injection rate Qmax of fuel of the target injection Dk, based on an integral value obtained by integrating the amount of the fuel pressure decrease due to the target injection Dk in the integration interval Tf.

Accordingly, the integration interval Tf is set in the reference interval Ta, the fuel pressure decrease amount due to the target injection Dk is integrated in the integration interval Tf, and the corresponding pressure decrease amount Pd corresponding to the maximum injection rate Qmax of the fuel of the target injection Dk is calculated based on the calculated integral value. The integration interval Tf is set to the integration interval Tf where the influence of the disturbance on the fuel pressure decrease due to the target injection Dk can be suppressed.

As the disturbance, there are pressure pulsation caused by a preceding injection Dz of a multi-stage injection and valve-opening pulsation caused by opening of the fuel injection valve 10, for example. If the disturbances cause variations in the fuel pressure decrease amount due to the target injection Dk, it is impossible to properly acquire the corresponding pressure decrease amount Pd.

Therefore, the integration interval Tf is set to the integration interval Tf where the influence of the disturbance on the fuel pressure decrease due to the target injection Dk can be suppressed. In this way, it is possible to properly calculate the corresponding pressure decrease amount Pd by suppressing the change such as the variations in the fuel pressure decrease amount due to the target injection Dk.

The corresponding pressure decrease amount Pd is calculated based on the integral value obtained by integrating the fuel pressure decrease amount due to the target injection Dk in the integration interval Tf. Therefore, as compared with a configuration where an instantaneous pressure decrease amount is employed, it is possible to properly calculate the corresponding pressure decrease amount Pd by satisfactorily suppressing the change.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. A fuel injection control device applied to a fuel injection system including a pressure sensor that detects a pressure of fuel supplied to a fuel injection valve, the device comprising:
   a reference interval calculation section configured to calculate a reference interval between an end time of a decrease interval where the pressure decreases as a fuel injection rate increases and a start time of an increase interval where the pressure increases as the fuel injection rate decreases on a pressure waveform detected by the pressure sensor;
   an integration interval setting section configured to set, in the reference interval, an integration interval where an influence of a disturbance on the fuel pressure decrease due to a target injection is suppressible and where the integration interval has a value that does not approach zero; and
   a decrease amount calculation section configured to calculate a corresponding pressure decrease amount, which is an amount of the fuel pressure decrease corresponding to a maximum injection rate of fuel of the target injection, based on an integral value obtained by integrating the amount of the fuel pressure decrease due to the target injection in the integration interval.

2. A fuel injection control device applied to a fuel injection system including a pressure sensor that detects a pressure of fuel supplied to a fuel injection valve, the device comprising:
   a reference interval calculation section configured to calculate a reference interval between an end time of a decrease interval where the pressure decreases as a fuel injection rate increases and a start time of an increase interval where the pressure increases as the fuel injection rate decreases on a pressure waveform detected by the pressure sensor;
   an integration interval setting section configured to set, in the reference interval, an integration interval where an influence of a disturbance on the fuel pressure decrease due to a target injection is suppressible; and
   a decrease amount calculation section configured to calculate a corresponding pressure decrease amount, which is an amount of the fuel pressure decrease corresponding to a maximum injection rate of fuel of the target injection, based on an integral value obtained by integrating the amount of the fuel pressure decrease due to the target injection in the integration interval; wherein:
   the fuel injection system performs a multi-stage injection including a plurality of injections of fuel in one combustion cycle;
   the target injection is a succeeding injection following a preceding injection of the multi-stage injection; and
   the integration interval setting section is configured to set a length of the integration interval at a length equal to or larger than one period of a pressure pulsation waveform generated by the preceding injection.

3. The fuel injection control device according to claim 2, further comprising a waveform processing section configured to subtract a model waveform obtained by modeling the pressure pulsation waveform generated by the preceding injection from the pressure waveform detected by the pressure sensor in the target injection, wherein the decrease amount calculation section is configured to calculate the corresponding pressure decrease amount by using a pressure waveform obtained by subtracting the model waveform by the waveform processing section.

4. The fuel injection control device according to claim 2, wherein:
   the integration interval setting section is configured to set the length of the integration interval at a length of N period(s) of the pressure pulsation waveform; and
   N is a natural number.

5. The fuel injection control device according to claim 1, wherein:
   the fuel injection system further includes an accumulator vessel that stores fuel under high pressure; and
   fuel is supplied from the accumulator vessel to the fuel injection valve.

6. A fuel injection control device applied to a fuel injection system including a pressure sensor that detects a pressure of fuel supplied to a fuel injection valve, the device comprising:
   a reference interval calculation section configured to calculate a reference interval between an end time of a decrease interval where the pressure decreases as a fuel injection rate increases and a start time of an increase interval where the pressure increases as the fuel injection rate decreases on a pressure waveform detected by the pressure sensor;
   an integration interval setting section configured to set, in the reference interval, an integration interval where an influence of a disturbance on the fuel pressure decrease due to a target injection is suppressible; and
   a decrease amount calculation section configured to calculate a corresponding pressure decrease amount, which is an amount of the fuel pressure decrease corresponding to a maximum injection rate of fuel of the target injection, based on an integral value obtained by integrating the amount of the fuel pressure decrease due to the target injection in the integration interval; wherein:
   the fuel injection system further includes an accumulator vessel that stores fuel under high pressure; and
   fuel is supplied from the accumulator vessel to the fuel injection valve;
   the integration interval setting section is configured to set the integration interval by excluding from the reference interval an opening disturbance interval between the end time of the decrease interval and a time corresponding to a first local maximum point of the pressure waveform generated after the decrease interval due to opening of the fuel injection valve.

7. The fuel injection control device according to claim 5, wherein the integration interval setting section is configured to set the integration interval by excluding from the reference interval an injection rate decrease interval between a predetermined time when the fuel injection rate starts to decrease from the maximum injection rate as a result of continuation of the target injection and the start time of the increase interval.

8. The fuel injection control device according to claim 1, wherein the integration interval setting section is configured to set the integration interval by excluding from the reference interval a drive interval where the fuel injection valve is driven.

9. The fuel injection control device according to claim 1, further comprising:
   a change index calculation section configured to calculate an aged change index indicating a degree of change of the corresponding pressure decrease amount calculated by the decrease amount calculation section due to aged change of the fuel injection valve; and an injection rate calculation section configured to calculate the maximum injection rate corresponding to the corresponding pressure decrease amount by using an initial maximum injection rate, which is the maximum injection rate in an initial state before the aged change of the fuel injection valve, and the aged change index.

10. The fuel injection control device according to claim 9, further comprising an abnormality determination section configured to determine abnormality of the fuel injection valve based on the aged change index.

11. The fuel injection control device according to claim 1, wherein:
the fuel injection system is placed in a vehicle; and
the corresponding pressure decrease amount is calculated every time a travel distance of the vehicle reaches a predetermined specified travel distance.

12. A fuel injection control device applied to a fuel injection system including a pressure sensor that detects a pressure of fuel supplied to a fuel injection valve, the device comprising a control circuit configured:
to calculate a reference interval between an end time of a decrease interval where the pressure decreases as a fuel injection rate increases and a start time of an increase interval where the pressure increases as the fuel injection rate decreases on a pressure waveform detected by the pressure sensor,
to set, in the reference interval, an integration interval where an influence of a disturbance on the fuel pressure decrease due to a target injection is suppressible and where the integration interval has a value that does not approach zero; and
to calculate a corresponding pressure decrease amount, which is an amount of the fuel pressure decrease corresponding to a maximum injection rate of fuel of the target injection, based on an integral value obtained by integrating the amount of the fuel pressure decrease due to the target injection in the integration interval.

13. The fuel injection control device according to claim 12, wherein:
the fuel injection system is configured to perform a multi-stage injection including a plurality of injections of fuel in one combustion cycle;
the target injection is a succeeding injection following a preceding injection of the multi-stage injection; and
the control circuit is further configured to set a length of the integration interval at a length equal to or larger than one period of a pressure pulsation waveform generated by the preceding injection.

14. The fuel injection control device according to claim 13, wherein the control circuit is further configured to:
subtract a model waveform obtained by modeling the pressure pulsation waveform generated by the preceding injection from the pressure waveform detected by the pressure sensor in the target injection, and
calculate the corresponding pressure decrease amount by using a pressure waveform obtained by subtracting the model waveform by the control circuit.

15. The fuel injection control device according to claim 14, wherein the control circuit is further configured to:
set the length of the integration interval at a length of N period(s) of the pressure pulsation waveform; and
N is a natural number.

16. The fuel injection control device according to claim 12, wherein the control circuit is further configured to:
set the integration interval by excluding from the reference interval an opening disturbance interval between the end time of the decrease interval and a time corresponding to a first local maximum point of the pressure waveform generated after the decrease interval due to opening of the fuel injection valve.

17. The fuel injection control device according to claim 12, wherein the control circuit is further configured to:
set the integration interval by excluding from the reference interval an injection rate decrease interval between a predetermined time when the fuel injection rate starts to decrease from the maximum injection rate as a result of continuation of the target injection and the start time of the increase interval.

18. The fuel injection control device according to claim 12, wherein the control circuit is further configured to:
set the integration interval by excluding from the reference interval a drive interval where the fuel injection valve is driven.

19. The fuel injection control device according to claim 12, wherein the control circuit is further configured to:
calculate an aged change index indicating a degree of change of the calculated corresponding pressure decrease amount due to aged change of the fuel injection valve; and
calculate the maximum injection rate corresponding to the corresponding pressure decrease amount by using an initial maximum injection rate, which is the maximum injection rate in an initial state before the aged change of the fuel injection valve, and the aged change index.

20. The fuel injection control device according to claim 12, wherein:
the fuel injection system is placed in a vehicle; and
the corresponding pressure decrease amount is calculated every time a travel distance of the vehicle reaches a predetermined specified travel distance.

* * * * *